United States Patent [19]

Holm

[11] 3,918,812
[45] Nov. 11, 1975

[54] DIAGNOSES OF DISEASE STATES BY FLUORESCENT MEASUREMENTS UTILIZING SCANNING LASER BEAMS

[75] Inventor: Dale M. Holm, Los Alamos, N. Mex.

[73] Assignee: The United States of America as represented by the United States Energy Research and Development Administration, Washington, D.C.

[22] Filed: May 7, 1973

[21] Appl. No.: 357,758

[52] U.S. Cl. .................. 356/73; 250/362; 250/365; 250/459; 250/461; 356/201
[51] Int. Cl.² .......................................... G01N 21/38
[58] Field of Search ........................... 250/361–363, 250/365–369, 458, 459; 356/51, 73, 96–98, 201, 39

[56] References Cited
UNITED STATES PATENTS

| 3,297,873 | 1/1967 | Hovnanian et al. .................... 356/73 |
| 3,699,336 | 10/1972 | Ehrlich ............................. 356/39 X |

OTHER PUBLICATIONS
Chemical Abstracts, Vol. 75, 1971, p. 202, Abstract No. 86614m, Kaufman et al., J. Histochem. Cytochem, 1971, 19(8), 469–476.

Primary Examiner—Alfred E. Smith
Assistant Examiner—F. L. Evans
Attorney, Agent, or Firm—Dean E. Carlson; Robert W. Weig

[57] ABSTRACT

An apparatus and method for determining the type, amount and position of antibodies and/or antigens in a biological cell. Dyes which affect selected antibodies and/or antigens in a particular manner are introduced into a subject cell. An exemplary single channel system moves a light beam in an X-Y scan relative to the cell. The dyed antibodies and/or antigens, when excited by specific wavelengths in the light beam, respond by fluorescing at predetermined wavelengths or absorbing certain of the specific wavelengths. The particular wavelengths fluoresced or absorbed indicate the types of antibodies and/or antigens present in the cell. The system preferably outputs to a color television system to produce a display representative of the antibody and antigen distribution in the cell by type, amount, and position. The application also discloses multichannel embodiments.

15 Claims, 3 Drawing Figures

3,918,812

DIAGNOSES OF DISEASE STATES BY FLUORESCENT MEASUREMENTS UTILIZING SCANNING LASER BEAMS

The invention described herein was made in the course of, or under, a contract with the U.S. ATOMIC ENERGY COMMISSION.

FIELD OF THE INVENTION

The invention relates to an apparatus and method for diagnosing diseases and more particularly to an apparatus and method for physically analyzing selected characteristics of biological cells to determine if and how they may be diseased.

BACKGROUND OF THE INVENTION

Fluorescent dyes have found widespread use in biology and medicine, examples being nucleic acid cytochemistry, fluorescent antibody studies, exfoliative cell diagnosis, cancer cell detection, and fluorochromasia. A prior art method for rapid, quantitative measurements of fluorescent light emission from cells containing fluorochrome utilizes a cellular flow system. Cells in aqueous suspension are measured at a rate of about $10^4$ to $10^5$ cells per minute.

Cells containing fluorochrome flow in a 50 $\mu$ diameter stream across a 100 $\mu$ diameter beam of exciting light. A photomultiplier receives resulting fluorescent light. Each cell takes about 15 to 20 $\mu$ sec to cross the light beam, during which time it fluoresces in response to the light beam stimulation. The electrical output signals from the photomultiplier are of a duration and an amplitude related to the duration and the intensity of the light fluoresced. The electrical output signals are amplified, amplitude analyzed, and stored in the memory of a multichannel pulse-height analyzer. The contents of the analyzer memory are producible as a frequency distribution histogram of fluorescent light emission per cell.

Although this prior art system operates satisfactorily, there is a need for a system to provide a color display of the amount, position and type of antibodies or antigens in a biological cell.

SUMMARY OF THE INVENTION

In accordance with the invention, a light beam moves in an X-Y scan across a selectively dyed biological cell containing antibodies and/or antigens. The dyed antibodies and antigens, in response to certain first wavelengths of exciting light within the beam, fluoresce at second preferably longer wavelengths. Other antibodies and antigens may be appropriately dyed so as to absorb particular wavelengths present in the beam. Detectors receive the fluoresced light and produce outputs representative of a preselected characteristic of the fluoresced light, such as its amplitude or its color. Other detectors may receive portions of the scanning beam after it passes through the cell to produce outputs representative of the scanning beam as modulated by the light absorptive dyed antibodies and/or antigens.

A color television picture or other such display, connected by appropriate electrical circuitry to the detector outputs, shows a visual representation of the dye responsive antibodies and antigens present in the scanned cell by type, amount, and position in the cell. The output information can also be recorded.

One object of the present invention is to provide an apparatus and method for distinguishing diseased biological cells from healthy ones.

Another object of the invention is to provide a color display or recording representative of the type, amount, and position of selected antibodies and antigens in a biological cell.

Still another object of the invention is to provide information on dye responsive antibodies and antigens of selected types present in a biological cell by their fluorescent or absorptive properties when exposed to light comprising predetermined wavelengths.

One advantage of practicing the present invention is that antibodies and antigens present in biological cells can quickly and economically be recognized.

Another advantage of the invention is that antibodies and antigens present in a biological cell observed in accordance with the invention can be classified by type, amount, and position within the cell.

Yet another advantage of practicing the present invention is that a visual display or recording can be made representative of the type, amount, and position of antibodies and antigens in a biological cell.

BRIEF DESCRIPTION OF THE DRAWINGS

Other objects and advantages of the invention will be apparent to those skilled in the art from the following disclosure with reference to the drawings wherein like numbers denote like parts and wherein.

DETAILED DESCRIPTION OF THE INVENTION

As used herein, the term "light" comprises the infrared, visible and ultraviolet portions of the electromagnetic spectrum.

Biological cells are cells from living organisms comprising at least one nucleus surrounded by cytoplasm although some biological cells, such as blood cells, have no nucleus. Antibodies comprise biological responses to antigens which comprise all materials recognized by the immunological system of the body as alien. Certain antibodies and antigens are dye responsive in that selected dyes can be associated with them. If stained antibodies are introduced into a biological cell containing appropriate antigens, the combination forms a chemical complex which will fluoresce in response to stimulating light of a particular wavelength. Antibodies can be detected in an inverse process with stained antigens. Absorption of incident light of predetermined wavelength can be detected in place of fluorescence in the above transactions.

Figure 1:
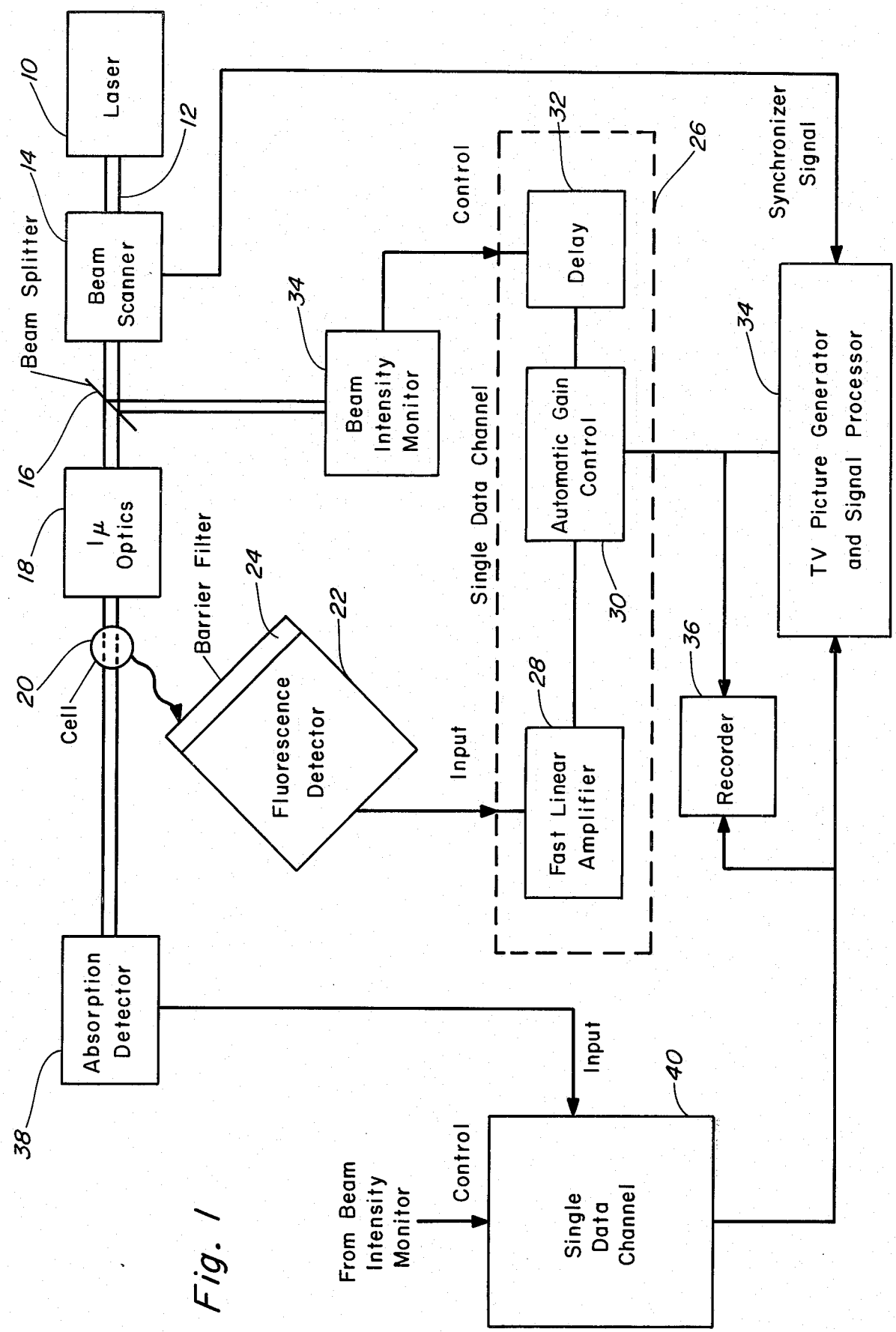
FIG. 1 schematically shows one embodiment of the invention comprising a single channel fluorescence and a single channel absorption cell analyzer.

Reference is now made to FIG. 1 wherein a system is shown incorporating a single channel fluorescence analyzer and a single channel absorption analyzer. Either the single channel fluorescence analyzer or the single channel absorption analyzer can be used alone. Alternatively, both channels can function simultaneously.

A light source 10, preferably a laser, emits light comprising at least the wavelength or wavelengths determined to initiate fluorescence in dye responsive antibodies and antigens in an appropriately dyed cell 20. If desired, light from the source 10 can also comprise the wavelength or wavelengths absorbed by other dye responsive antibodies or antigens in the cell.

A light beam 12 from laser 10 passes through a beam scanner 14 which scans the beam onto a beam splitter 16 in an X scan, or in an X-Y scan, as desired. A portion of beam 12 passes through beam splitter 16 and optics 18 which provides a narrow output beam having a diameter on the order of one micron (1 $\mu$) to scan cell 20. If scanner 14 provides an X scan, cell 20 moves in a direction perpendicular to the X scan. Alternatively, if scanner 14 moves the beam in an X-Y scan, the cell remains relatively stationary thereto during the comparatively rapid scan. Thus, cell 20 can move slowly through the scanning field because the scanning rate is sufficiently fast that such cell movement is negligible in comparison.

Scanners capable of functioning as desired are well known to those skilled in the art. Such scanners typically comprise rotating mirrors or acoustooptic cells. Optics 18 preferably comprise conventional lenses which produce a beam on the order of 1 $\mu$ in diameter at cell 20. Such lens arrangements are also well known.

Cell 20 is a biological cell into which a dye or dyes have been introduced. The dye or dyes can be selected to produce fluorescence when in contact with a particular type or types of antibodies and antigens. Too, dyes which cause a certain type or types of antibodies or antigens to absorb a determined wavelength or wavelengths of light can also be introduced into the cell 20. If the fluorescing antibodies or antigens sought are present in the dyed cell, they will fluoresce at a predetermined wavelength or wavelengths when exposed to light of a selected wavelength or wavelengths. If the light absorption inducing dye or dyes are applied to the cell, the particular antibodies or antigens affected thereby will absorb light of the predetermined wavelength or wavelengths. One dye or several compatible dyes can be introduced into the cell. Dyes used simultaneously should not interact so as to chemically or physically inhibit the desired characteristics of any other dye present in the cell. Naturally, only dyes particularly suited to the wavelength capabilities of the light source utilized should be used.

If the fluorescently stained complex of antibodies or antigens sought are in the subject cell, the dyed antibodies or antigens will fluoresce when irradiated with light from source 10. Fluorescence detector 22 receives the fluoresced light passing through barrier filter 24. Filter 24 only allows passage of light within relatively long wavelength bands such as that produced by fluorescing bodies and prevents the passage into detector 22 of light of shorter wavelengths such as that from laser source 10. Detector 22 produces an output signal in accordance with a selected characteristic of the fluorescent light incident thereon. Preferably, the selected characteristic of the fluoresced light is amplitude, but other workable characteristics will be apparent to those skilled in the art. The output signal of detector 22 is preferably electrical but could be mechanical, fluid, or optical. The output can be analog or digital. In accordance with a preferred embodiment, the detector output signal comprises an amplitude modulated analog electrical signal, although the signal could as well be phase modulated or digital.

A single channel data analyzer 26 comprising the components within the dotted line receives the amplitude modulated electrical output signal from fluorescence detector 22. Analyzer 26 contains a fast linear amplifier 28 which receives the output signal from detector 22, amplifier it, and sends the amplified signal to an automatic gain control device 30. A signal indicative of the variance in the intensity of light from source 10 also enters gain control device 30 from a beam intensity monitor 34 which receives a portion of beam 12 as reflected by beam splitter 16. The beam intensity signal is time synchronized with the output of amplifier 28 by a delay element 32. Automatic gain control 30 normalizes the fluorescence intensity signal to compensate for changes in illumination and produces an output quantitatively representative of antibody and antigen concentration in the cell 20 on a point by point basis.

The output of automatic gain control 30 passes by conventional apparatus to a signal processor and television picture generator 34, which comprises conventional components assembled in a fashion well known to those skilled in the art and which need not be discussed herein. The television circuitry is synchronized with scanner 14 so as to produce a visual display representative of the dyed antibodies and antigens within cell 20 by type, amount, and position. The television picture is preferably in color so as to provide the clearest visual picture of the dyed cell and its antibodies and antigens. In addition, the picture can be recorded by a recorder 36 which represents a well known recording means such as a photographic, electrographic, or magnetic recording device capable of recording from the television display or from an analog or digital output signal from the single channel analyzer 26.

An absorption detector 38 can also be utilized. Detector 38 receives light passing through cell 20 from source 10. The output of absorption detector 38 represents the amount of scanning light of selected wavelengths from source 10 absorbed by appropriately dyed antibodies or antigens within cell 20.

Detector 38 outputs to a single data channel analyzer 40 similar to analyzer 26. Analyzer 40 receives an output from beam intensity monitor 34 and itself outputs to television picture generator and signal processor 34 or recorder 36 to provide a television picture and, if desired, a recording which indicates the dye-responsive antigens and antibodies present in the cell by type, number, and position. The fluorescence and absorption channels may be used separately, sequentially, or simultaneously.

Figure 2:
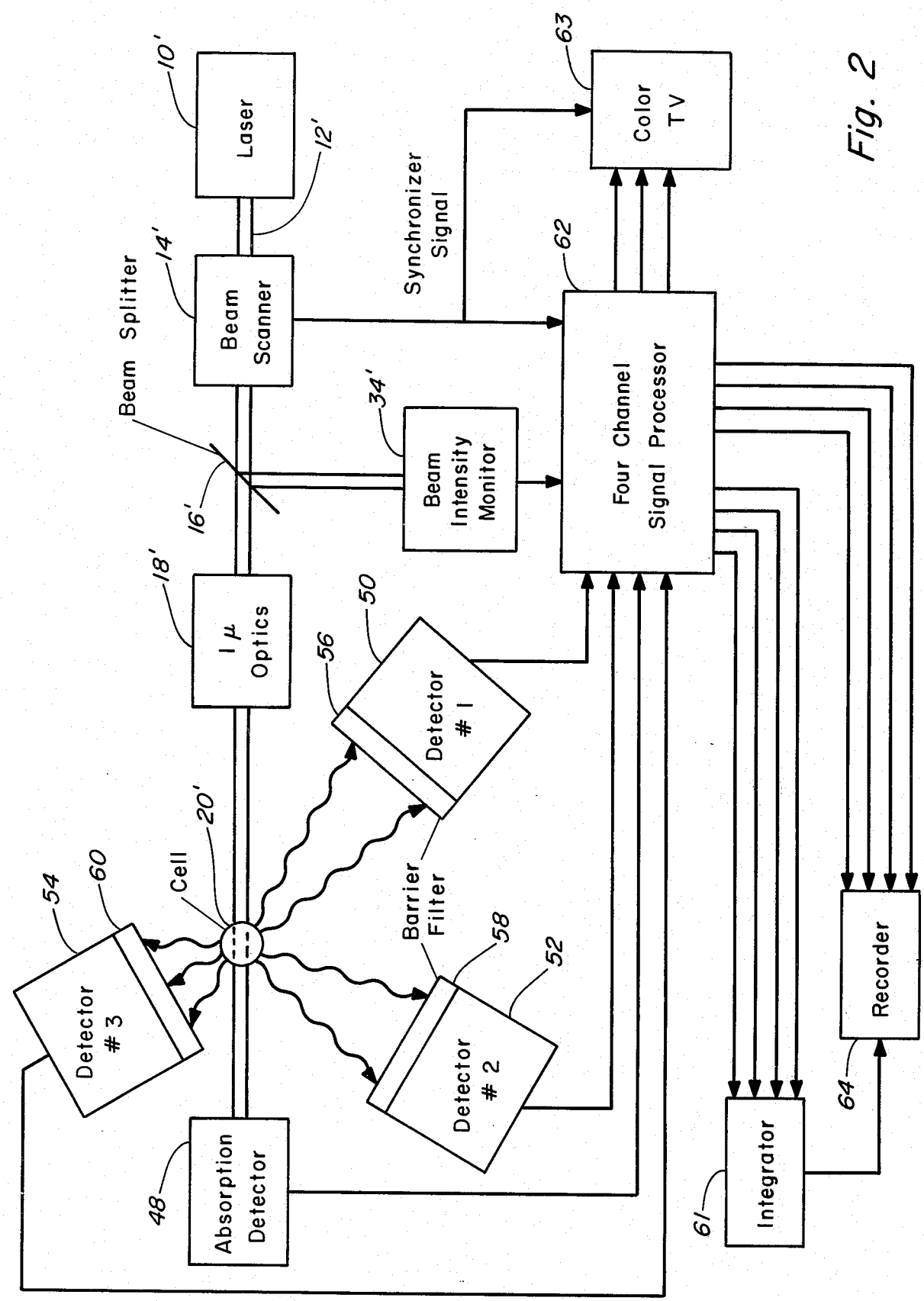
FIG. 2 is a schematic diagram of an embodiment of the invention providing four-channel analytical capability.

FIG. 2 shows an embodiment of the invention comprising a plurality of channels, every one of which processes a wavelength of light different from the wavelengths processed by the other channels. A source such as a laser 10', emits aa beam of light 12'. Beam 12' is received and given scanning motion by beam scannner 14' which functions as scanner 14 of FIG. 1. Beam splitter 16', beam size reduction optics 18', and beam intensity modulator 34' also function similarly to their respective counterparts of FIG. 1. A cell 20' moves in the Y direction as scanner 14' scans in the X direction. Alternatively, scanner 14' can X-Y scan a relatively stationary cell 20'.

Beam 12', reduced in size to the 1 $\mu$ range by optics 18', scans dye containing cell 20'. If the sought, dye-responsive fluorescing antibodies or antigens are present in the cell, they fluoresce at predetermined wavelengths when stimulated by the selected wavelength present in beam 12'.

An absorption detector 48 and a plurality of fluorescence detectors, 50, 52, and 54, are disposed about cell 20'. Detectors 50, 52, 54, and 48 receive light fluoresced and absorption modulated, respectively, by the dyed antigens or antibodies in cell 20' subjected to light beam 12'. Between each of the fluorescence detectors 50, 52, and 54, and the cell 20' are located barrier filters 56, 58, and 60, respectively. Filters 56, 58, and 60 are narrow band optical filters which allow, for each detector, a selected wavelength or wavelengths of fluoresced light to pass. Thus, the fluorescent wavelength distribution can be measured, so as to categorize, for example, dye responsive antibodies present in the cell by type and amount.

The output signals produced by detectors 48, 50, 52, and 56 pass to a four-channel signal processor 62 and color television picture generator 63. If, for example, a different one of three distinct fluorescent wavelengths are received by every one of the three detectors, a three-color display showing antibody and antigens in the cell by type, amount, and position will be visible on the television screen.

The output of the absorption detector 48 is processed and displayed as in FIG. 2. Too, the output of detector 48 can be added to that representative of fluorescence and displayed or recorded.

The outputs of the detectors 48, 50, 52, and 56 can also go directly to a recorder 64 which can be, for example, a photographic, electrographic, or magnetic storage apparatus for recording dyed antibodies and antigens by type, amount, and position in the cell. Too, an integrator 61 can receive and process the signals to simplify the data for recording. More than three fluorescent light detectors can be utilized, preferably with one analyzer channel for each detector. A plurality of detector outputs could also be multiplexed in one channel. Other signal processing techniques will be apparent to those skilled in the art.

Figure 3:
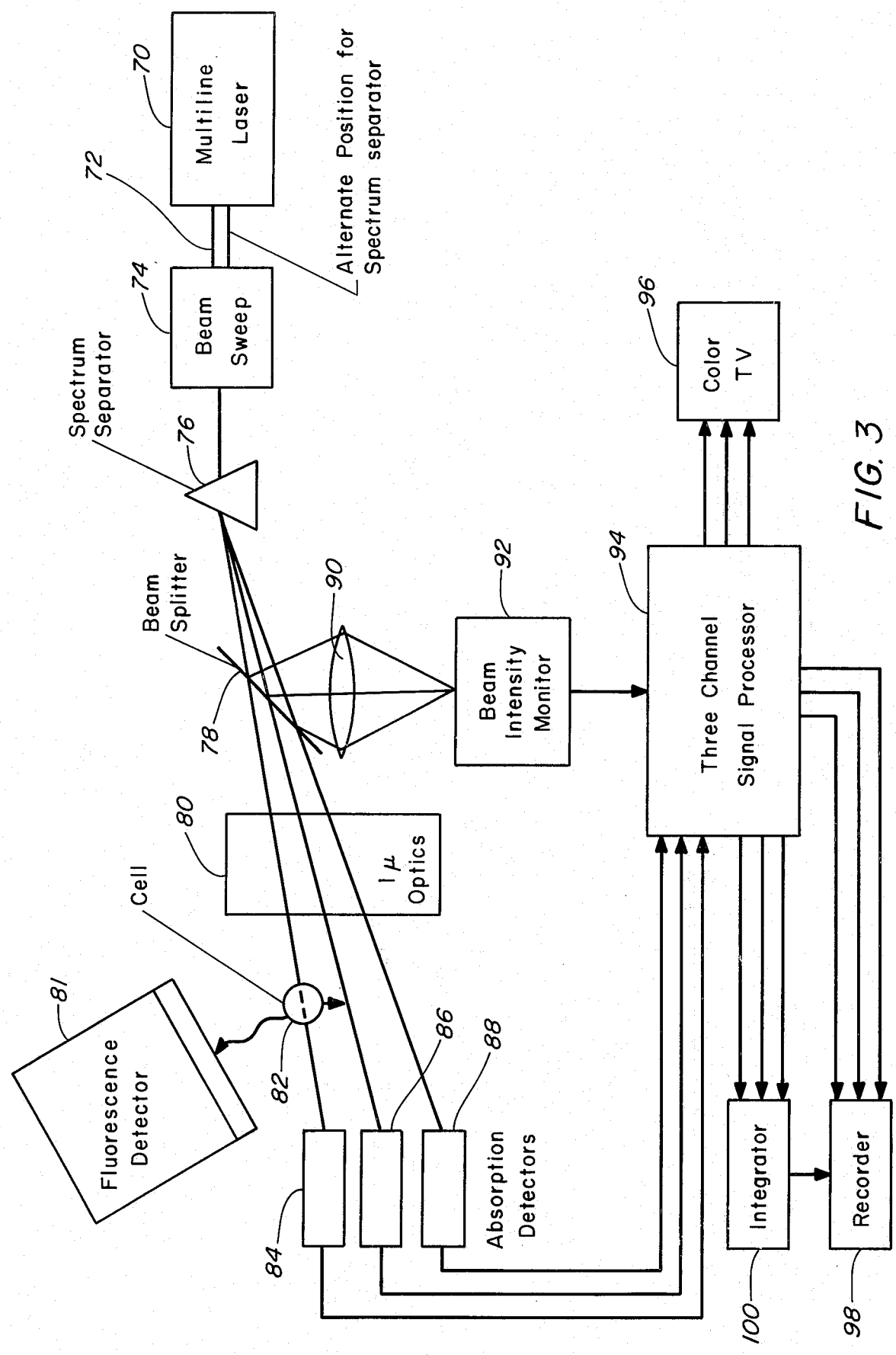
FIG. 3 is a schematic showing of another multichannel cell analyzer in accordance with the invention.

An apparatus for obtaining a plurality of outputs representative of dyed antibodies and antigens which absorb light of different wavelengths, depending on the dye used and type of antibody dyed appears schematically in FIG. 3. A light source 70 comprises a laser capable of generating a plurality of wavelengths in a single beam or a plurality of lasers with optics for combining their beams into one or more beams 72. Such optics are well known to those skilled in the art. The illustration shows a multi-wavelength laser embodiment. An X-direction scanner or beam sweeper 74 receives the multi-wavelength beam 72 from source 70 and scans the beam through a spectrum separator such as a prism 76, which bends each separate wavelength component of the beam a different amount, in well known fashion. If a plurality of lasers are used, prisms need not be used. The spread beam impinges on a beam splitter 78. A portion of the spread beam passes through beam splitter 78, beam size reduction optics 80, and a cell 82. Beam reduction optics 80 are similar to those of FIGS. 1 and 2. Preferably, cell 82 moves in the Y direction so that an X-Y scan is effected. Alternatively, scanner 74 can be an X-Y scanner and cell 82 held stationary relative thereto. Of course, the cell 82 may be moved relatively slowly when compared to the rapid sweep of an X-Y scanner, so that a continuous stream of separated cells may move past the scanner.

Absorption detectors 84, 86, and 88, each responsive to a different one of selected wavelengths present in beam 72, receive the different wavelength components as they pass through cell 82. The selected wavelengths present in beam 72 pass through cell 82 in order of wavelengths so that absorption detectors 84, 86, and 88 register readings of a given point in the cell sequentially a fluorescence detector 81 may also be provided. Beam splitter 78 reflects a portion of the light in the spectrally separated beam 72 through a focusing or collimating optics, represented by a lens 90, onto a beam intensity monitor 92. Absorption detectors 84, 86, and 88 and beam intensity monitor 92 output to a three-channel signal processor 94, similar to four-channel processor 62 of FIG. 2. Filters can be disposed in front of each of the detectors 84, 86, and 88 to attenuate unwanted wavelengths and to allow passage of selected wavelengths onto each of the detectors. Thus, each detector receives only light of the wavelengths which it should monitor. Output signals from processor 62 can be used to form a color visual display on color television 96 and to record on a suitable recording device 98, similar to recorder 64 of FIG. 2. Too, processor 94 can output to an integrator 100 which integrates the three signals and outputs to recorder 98 to provide simplified records of, for example, the total number of antibodies and antigens present in cell 82, or the number of antibodies and antigens present in cell 82 classified by type.

Image enhancement and other techniques well known to those skilled in the art will improve the color television picture of the systems disclosed herein.

Biological cells under study can be moved in many well known ways, such as in a fluid suspension through the neck of an hour-glass-shaped capillary, on a motor-driven slide, or by fluid pressure.

Other embodiments of the invention will be apparent to those skilled in the art and the invention should not be construed to be limited to the preferred embodiments of the preceding description. cm I claim:

1. A method for producing an output representative of at least one type of antibody or antigen in a biological cell containing a dye for sensitizing at least one of the types of antibodies or antigens possibly present within the cell, so that when the one type of antibody or antigen is stimulated by a selected wavelength of light, it fluoresces at a predetermined wavelength, the method comprising the steps of:
   moving the cell in a first direction;
   producing a light beam comprising the selected wavelength and having a diamter substantially smaller than the cross section of the cell;
   moving the light beam in a second direction essentially perpendicular relative to the first direction in which the cell moves to provide an X-Y scan across the cell, thereby causing at least the one type of dyed antibodies or antigens in the cell to fluoresce at the predetermined wavelength;
   detecting the fluoresced light; and
   creating an output in accordance with at least one characteristic of the fluoresced light representative of at least the one type of antibody or antigen in the cell.

2. The method of claim 1 wherein the characteristic is amplitude.

3. The invention of claim 1 further comprising generating a color display in accordance with the characteristic to provide an indication of the type of dyed antibodies or antigens within the cell.

4. The invention of claim 1 further comprising making a record in accordance with the characteristic to provide an indication of the type of dyed antibodies or antigens within the cell.

5. A method for producing an output representative of at least one type of antibody or antigen in a biological cell containing a dye for sensitizing at least one of the types of antibodies or antigens possibly present within the cell so that when the one type of antibody or antigen is struck with light of a selected wavelength, it partially absorbs such light, the method comprising the steps of:
 moving the cell in a first direction;
 producing a light beam comprising the selected wavelength, and having a diameter substantially smaller than the cross section of the cell;
 moving the light beam in a second direction essentially perpendicular relative to the first direction in which the cell moves to provide an X-Y scan across the cell, thereby causing at least the one type of the dyed antibodies or antigens in the cell to absorb the predetermined wavelength;
 detecting the absorbance modulated light; and
 creating an output in accordance with at least one characteristic of the absorbance modulated light representative of at least one type of antibody or antigen in the cell.

6. The method of claim 5 wherein the characteristic is amplitude.

7. The invention of claim 5 further comprising generating a color display in accordance with the characteristic to provide an indication of the type of dyed antibodies or antigens within the cell.

8. A method for producing an output representative of antibodies or antigens in a biological cell containing at least one dye which renders some of the antibodies or antigens light absorbent at selected wavelengths and other antibodies or antigens fluorescent at particular wavelengths in response to light of preselected wavelengths incident on such dye responsive antibodies or antigens, the method comprising the steps of:
 moving the cell in a first direction;
 producing a light beam having a diameter substantially smaller than the cross section of the cell;
 moving the light beam in a second direction essentially perpendicular to the first direction of movement of the cell to produce an X-Y scan across the cell;
 detecting the light fluoresced by the dye responsive antibodies or antigens and producing a first output representative thereof;
 determining the light absorbed by the dyed antibodies or antigens within the cell and producing a second output representative thereof; and
 generating a display in response to the first and second outputs representative of the dye responsive antibodies and antigens in the cell.

9. An apparatus for determining the presence of particular antibodies or antigens in a biological cell by at least one of type, amount, and position, the antibodies or antigens being detectable when introduced to at least one selected dye and when illuminated with light comprising at least one predetermined wavelength, the apparatus comprising:
 means for moving said cell in a first direction;
 means for generating and scanning across said cell in a second direction essentially perpendicular to said first direction a light beam substantially smaller in cross section than the cell comprising said one wavelength to cause the dye responsive antibodies or antigens of at least said one type to fluoresce light comprising a second wavelength;
 means for detecting said second wavelength of light fluoresced by said antigens or antibodies and for generating a signal having at least one characteristic in accordance with the detected wavelength of light; and
 means for producing an output in accordance with said signal comprising information of at least one of said type, amount, and position of the dye responsive antibodies or antigens in said cell.

10. The invention of claim 9 further comprising means for producing a visual display of at least one of the type, amount, and position of said antibodies or antigens in said cell in accordance with said signal.

11. The invention of claim 9 further comprising means for producing a record of at least one of the type, amount, and position of said antibodies or antigens in said cell in accordance with said signal.

12. The invention of claim 9 further comprising means for detecting light of selected wavelengths in said beam as absorbance modulated by said cell, and for producing an absorbance signal representative thereof; and
 means for producing an output in accordance with said absorbance signal comprising information on at least one of said type, amount, and position of the dye responsive antibodies or antigens within said cell.

13. An apparatus for determining the presence of particular dye responsive antibodies or antigens in a biological cell into which said dye has been introduced by at least one of type, amount, and position when illuminated with light comprising at least one selected wavelength, the apparatus comprising:
 means for moving said cell in a first direction;
 means for generating and scanning across said cell in a second direction essentially perpendicular to said first direction a light beam substantially smaller in cross section than the cell comprising at least one wavelength to cause the dye responsive antibodies or antigens of at least said one type to absorb said one wavelength;
 means for detecting said absorbance modulated light passing through said antigens or antibodies and for generating a signal having at least one characteristic in accordance with said absorbance modulated light; and
 means for producing an output in accordance with said signal comprising information on at least one of said type, amount, and position of the dye responsive antibodies or antigens in said cell.

14. The invention of claim 13 further comprising means for producing a visual display of at least one of the type, amount, and position of said antibodies or antigens in said cell in accordance with said signal.

15. The invention of claim 13 further comprising means for producing a record of at least one of the type, amount and position of said antibodies or antigens in said cell in accordance with said signal.

* * * * *